(12) United States Patent
Li et al.

(10) Patent No.: US 10,355,268 B2
(45) Date of Patent: Jul. 16, 2019

(54) CARBON-METAL OXIDE COMPOSITE MATERIALS AND THEIR USE IN ANODES OF LITHIUM AND SODIUM ION BATTERIES

(71) Applicants: UT-Battelle, LLC, Oak Ridge, TN (US); University of Tennessee Research Foundation, Knoxville, TN (US)

(72) Inventors: Yunchao Li, Knoxville, TN (US); Mariappan Parans Paranthaman, Knoxville, TN (US); Amit K. Naskar, Knoxville, TN (US); Kokouvi M. Akato, Knoxville, TN (US)

(73) Assignees: UT-Battelle, LLC, Oak Ridge, TN (US); University of Tennesse Research Foundation, Knoxville, TN (US)

( * ) Notice: Subject to any disclaimer, the term of this patent is extended or adjusted under 35 U.S.C. 154(b) by 973 days.

(21) Appl. No.: 14/828,016

(22) Filed: Aug. 17, 2015

(65) Prior Publication Data
US 2017/0054144 A1  Feb. 23, 2017

(51) Int. Cl.
*H01M 4/36* (2006.01)
*H01M 10/0525* (2010.01)
(Continued)

(52) U.S. Cl.
CPC .......... *H01M 4/366* (2013.01); *H01M 4/483* (2013.01); *H01M 4/587* (2013.01);
(Continued)

(58) Field of Classification Search
CPC .......... H01M 10/0525; H01M 10/054; H01M 2004/027; H01M 4/366; H01M 4/483; H01M 4/587
See application file for complete search history.

(56) References Cited

U.S. PATENT DOCUMENTS

| | | |
|---|---|---|
| 7,205,073 B2 | 4/2007 | Kim et al. |
| 7,425,388 B2 | 9/2008 | Park et al. |
| (Continued) | | |

OTHER PUBLICATIONS

Bonino, C.A. et al., "Electrospun Carbon-Tin Oxide Composite Nanofibers for Use as Lithium Ion Battery Anodes", ACS Appl. Mater. Interfaces, (2011), vol. 3, pp. 2534-2542.
(Continued)

*Primary Examiner* — Lingwen R Zeng
(74) *Attorney, Agent, or Firm* — Scully Scott Murphy & Presser (57) ABSTRACT

A carbon-metal oxide composite material comprising: (i) carbon-carbon composite particles in which an amorphous carbon black core is bonded to crystalline graphitic carbon shells; and (ii) a metal oxide material bonded with said carbon-carbon composite particles, wherein said metal oxide material is included in an amount of at least about 10 wt. % by weight of said carbon-carbon composite particles and metal oxide material. Alkali-ion batteries containing the above-described composite as anode are also described. Methods for producing the above-described composite are also described. The method can include, for example, subjecting pulverized rubber tire waste to a sulfonation process and pyrolyzing the sulfonated rubber to produce the carbon-carbon composite particles, as described above, followed by admixing and compounding a metal oxide material with the carbon-carbon composite particles. The method may alternatively employ a metal oxide precursor, which can be admixed with the sulfonated rubber and converted to metal oxide during pyrolysis.

29 Claims, 3 Drawing Sheets

(51) Int. Cl.
*H01M 10/054* (2010.01)
*H01M 4/587* (2010.01)
*H01M 4/48* (2010.01)
*H01M 4/02* (2006.01)

(52) U.S. Cl.
CPC ..... *H01M 10/054* (2013.01); *H01M 10/0525* (2013.01); *H01M 2004/027* (2013.01)

(56) References Cited

U.S. PATENT DOCUMENTS

| | | |
|---|---|---|
| 8,252,438 B2 | 8/2012 | Han et al. |
| 8,835,041 B2 | 9/2014 | Johnson et al. |
| 8,906,542 B2 | 12/2014 | Johnson et al. |
| 2015/0021525 A1 | 1/2015 | Naskar et al. |
| 2015/0246816 A1* | 9/2015 | Liu .................. H01M 4/13 216/39 |

OTHER PUBLICATIONS

Chen, J. et al., "Highly Monodispersed Tin Oxide/Mesoporous Starbust Carbon Composite as High-Performance Li-Ion Battery Anode" ACS Appl. Mater. Interfaces, (2013), vol. 5, pp. 7682-7687.

Naskar, A.K. et al., "Tailored recovery of carbons from waste tires for enhanced performance as anodes in lithium-ion batteries", RSC Adv., (2014), vol. 4, pp. 38213-38221.

* cited by examiner

CARBON-METAL OXIDE COMPOSITE MATERIALS AND THEIR USE IN ANODES OF LITHIUM AND SODIUM ION BATTERIES

This invention was made with government support under Prime Contract No. DE-AC05-00OR22725 awarded by the U.S. Department of Energy. The government has certain rights in the invention.

FIELD OF THE INVENTION

The present invention relates, generally, to carbon composite materials, and more particularly, to lithium and sodium batteries in which the anode is based on carbon.

BACKGROUND OF THE INVENTION

Lithium-ion batteries have found widespread usage in various electronic devices because of their light weight and high energy density relative to other types of batteries. Sodium-ion batteries are also gaining increasing interest as cost-effective alternatives with greater safety potential. However, particularly for high power applications, such as electric vehicles, there has been a continuing effort to improve the energy output, capacity, capacity retention over multiple cycles (cycling performance), and useful lifetime in lithium and sodium ion batteries to better suit these high power applications.

SUMMARY OF THE INVENTION

In one aspect, the invention is directed to a carbon-metal oxide composite material (i.e., "composite material") that includes: (i) carbon-carbon composite particles in which an amorphous carbon black core is bonded to crystalline graphitic carbon shells; and (ii) a metal oxide material bonded with the carbon-carbon composite particles, wherein the metal oxide material is included in an amount of at least 10 wt. % by weight of the carbon-carbon composite particles and metal oxide material. When the carbon-metal oxide composite material is used in an anode of a lithium-ion battery, the composite material has herein been found to significantly improve one or more operational characteristics of the alkali-ion battery, such as energy output, capacity, capacity retention over multiple cycles (cycling performance), and/or useful lifetime. In particular embodiments, the carbon-carbon composite particles described above are derived from rubber tire waste material, as further described below. As such, the invention provides further and greater benefits by also recycling rubber tire waste material into a highly useful and improved product.

In another aspect, the invention is directed to a method for producing the above-described carbon-metal oxide composite material. In a first embodiment, the method generally includes: (i) subjecting pulverized rubber tire waste material to a sulfonation process to produce sulfonated rubber tire waste; (ii) pyrolyzing the sulfonated rubber tire waste in an inert atmosphere to produce carbon-carbon composite particles in which an amorphous carbon black core is bonded to crystalline graphitic carbon shells; and (iii) admixing and compounding a metal oxide material with the carbon-carbon composite particles to produce the carbon-metal oxide composite material in which the metal oxide material is bonded with the carbon-carbon composite particles. In a second embodiment, the method generally includes: (i) subjecting pulverized rubber tire waste material to a sulfonation process to produce sulfonated rubber tire waste; (ii) admixing and compounding a metal oxide precursor material with the sulfonated rubber tire waste; and (iii) pyrolyzing the admixture of sulfonated rubber tire waste and metal oxide precursor in an inert atmosphere to produce carbon-carbon composite particles bonded with a metal oxide material derived from the metal oxide precursor material.

In another aspect, the invention is directed to lithium-ion or sodium-ion batteries (i.e., "alkali-ion batteries") in which the anode includes the above-described carbon-metal oxide composite material. The battery also includes a cathode and a lithium- or sodium-containing electrolyte in contact with the anode and cathode, as well known in the art. In particular embodiments, the battery exhibits a reversible capacity of at least or above 500 mAh/g or 600 mAh/g along with a very stable capacity retention over 10, 20, 30, 40, or 50 cycles.

DETAILED DESCRIPTION OF THE INVENTION

In a first aspect, the invention is directed to a carbon-metal oxide composite material (i.e., "composite material"). The composite material contains: (i) carbon-carbon composite particles (i.e., "carbon-carbon particles"); and (ii) a metal oxide material bonded with the carbon-carbon composite particles. The carbon-carbon particles are generally of nanoscale size (i.e., nanoparticles), e.g., up to or less than 200 nm, 150 nm, 100 nm, 50 nm, 20 nm, 10 nm, or 5 nm, and are generally irregularly shaped but with a globular or approximately spherical morphology. The metal oxide material is also generally either in the form of nanoparticles (e.g., as above) bonded with the carbon-carbon particles, or in the form of a nano-thick coating of analogous thickness on the carbon-carbon particles. Generally, the composite material is characterized by agglomerations or aggregates of the carbon-carbon particles, with the metal oxide material bonded with the agglomerates and/or individual carbon-carbon particles. The carbon-carbon particles and corresponding composite materials are generally non-fibrous. The term "bonded," as used herein, refers to any interaction that maintains physical contact between the carbon-carbon particles and metal oxide material. The interaction is generally physisorption, although hydrogen bonding, ionic bonding, or covalent bonding may also be involved.

In the carbon-carbon particles, an amorphous carbon black core is bonded to crystalline graphitic carbon shells. The term "core," a used herein, indicates an inner portion, while the term "shell" indicates an outer portion. Typically, the core-shell arrangement referred to herein is approximate, with the carbon cores embedded within and separated by the carbon shell in the form of a matrix. However, the approximate core-shell arrangement described above may also be characterized by the presence of individual core-shell particles in which a single core is surrounded by a single shell. The term "carbon," as used herein, refers to elemental carbon. As indicated, the core and shell, although both are constructed of carbon, have unique microstructures (e.g., amorphous and graphitic character, respectively), and these unique microstructures meet at a core-shell interface. Besides the difference in crystallinity and structure between the core and shell, the core and shell can have compositional differences. For example, the carbon shell may include sulfur (as generally present in tire rubber) and generally also includes a level of unsaturation (i.e., carbon-carbon double bonds), as provided by the sulfonation and pyrolysis process. The carbon black core generally does not include sulfur or unsaturation.

The metal in the metal oxide material can be or include any one or more elements of the Periodic Table having a metallic character (i.e., by forming stable ions in ionic compounds). The metal oxide material considered herein is a solid material, generally particulate, and more typically, in nanoparticulate form, such as a particle size of up to or less than 1000 nm, 500 nm, 200 nm, 150 nm, 100 nm, 50 nm, 20 nm, 10 nm, or 5 nm. The metal oxide can be, for example, an oxide of one or more metals selected from alkali metals, alkaline earth metals, transition metals (Groups 3-12 of the Periodic Table), main group metals (Groups 13-15 of the Periodic Table), and rare earth metals. Some examples of alkali metal oxides include $Li_2O$, $Na_2O$, $K_2O$, and $Rb_2O$. Some examples of alkaline earth metal oxides include MgO, CaO, SrO, and BaO. Some examples of transition metal oxides include $Sc_2O_3$, $TiO_2$, $V_2O_5$, VO, $Cr_2O_3$, $MnO_2$, $Mn_2O_3$, $Fe_2O_3$, $Fe_3O_4$, FeO, $CO_2O_3$, $CO_3O_4$, $Ni_2O_3$, NiO, CuO, $Cu_2O$, ZnO, $Y_2O_3$, $ZrO_2$, $NbO_2$, $Nb_2O_5$, $TiNb_2O_7$, $RuO_2$, PdO, $Ag_2O$, CdO, $HfO_2$, $Ta_2O_5$, $WO_2$, and $PtO_2$, any of which may be a polyoxometalate, where applicable. Some examples of main group metal oxides include $SiO_2$ (i.e., "silicon oxide" or "silica"), $Al_2O_3$, $B_2O_3$, $Ga_2O_3$, a tin oxide (e.g., SnO or $SnO_2$), PbO, $PbO_2$, $Sb_2O_3$, $Sb_2O_5$, and $Bi_2O_3$. Some examples of rare earth metal oxides include CeO, $Ce_2O_3$, $Sm_2O_3$, $Eu_2O_3$, $Gd_2O_3$, and $Tb_2O_3$. In some embodiments, the metal oxides are selected from oxides of scandium, titanium, vanadium, chromium, manganese, iron, cobalt, nickel, copper, zinc, yttrium, zirconium, niobium, hafnium, tantalum, tungsten, boron, aluminum, gallium, indium, silicon, germanium, and tin, or a sub-selection of any of the foregoing metal oxides.

The metal oxide is more preferably one that can readily go through reduction and oxidation due to lithium or sodium insertion. Some particular examples of such metal oxides include oxides of titanium, vanadium, chromium, manganese, iron, cobalt, nickel, copper, niobium, tungsten, gallium, indium, and tin.

The metal oxide may also contain two or more metals independently selected from any of the foregoing types of metals (e.g., binary or ternary metal oxide compositions containing two, three, or more metals independently selected from alkali, alkaline earth, main group, transition metal, and rare earth metals). The metal oxide containing more than one metal can be, for example, a spinel metal oxide (e.g., $CoMn_2O_4$, $ZnMn_2O_4$, $MgAl_2O_4$, $CoFe_2O_4$, $MnFe_2O_4$, or $LiMn_2O_4$) or perovskite metal oxide (e.g., $CaTiO_3$, $SrTiO_3$, $BaTiO_3$, $LiNbO_3$, $BaZrO_3$, and $LaAlO_3$). In some embodiments, the metal oxide may include metal-binding groups other than oxide attached to the metal. The other metal-binding groups may be, for example, hydroxyl (OH), halide (e.g., F, Cl, or Br), complex inorganic anion (e.g., carbonate or sulfate), or chelating or non-chelating organic ligand (e.g., a carboxylate, dicarboxylate, alkoxide, phenoxide, pyridine, bipyridine, acetylacetonate, or salicylaldehyde ligand).

The above-described metal oxide compositions are well known in the art, and powder (particulate) versions thereof are either commercially available or can be prepared by means well known in the art. In some embodiments, any one or more classes or specific types of metal oxide compositions, as provided above, are excluded from the composite material. In some embodiments, the metal oxide material includes only one or more types of metal ions along with oxide ions, and may or may not include an organic ligand.

The metal oxide material is generally included in an amount of about, at least, or above 10 wt. % by weight of the carbon-carbon composite particles and metal oxide material. In different embodiments, the metal oxide is included in an amount of about, at least, above, up to, or less than, for example, 15, 20, 25, 30, 35, or 40 wt. %. As used herein, the term "about" generally indicates within ±0.5, 1, 2, 5, or 10% of the indicated value. Thus, an amount of "about 10 wt. %" generally indicates, in its broadest sense, an amount of 9-11 wt. %.

The carbon-metal oxide composite material generally possesses a significant portion of pores having a pore size of up to or less than 10 nm, and more typically, up to or less than 5, 4, 3, 2, or 1 nm. In some embodiments, at least or more than 20%, 30%, 40%, 50%, 60%, 70%, 80%, 90%, or 95% of the pore volume is attributed to pores having a pore size up to or less than 10, 8, 5, 4, 3, 2, or 1 nm, or a pore size within a range bounded by any two of the foregoing values. The total pore volume of the composite material is typically up to or less than 0.5, 0.4, 0.3, 0.2, 0.15, 0.1, or 0.05 $cm^3/g$. The BET surface area of the composite material is typically up to or less than 200, 150, 100, 90, 80, 70, 60, or 50 $m^2/g$.

In another aspect, the invention is directed to a method for producing the above-described carbon-metal oxide composite material. First, the method requires a source of pulverized rubber tire waste. The pulverized rubber tire waste can be obtained from a tire recycling plant or can be produced directly by tire grinding techniques well known in the art. The pulverized rubber tire waste is generally composed of macroscopic particles, e.g., millimeters or centimeters (or up to or less than 1 cm or 1 mm) in size, but may also be in the micron size range, e.g., up to or less than 500 or 250 microns. The carbon black particles in the tire waste are typically present as particles of about 10 to 200 nm in size, often in agglomerated form. As well known in the art, rubber tire waste is generally composed of a mixture of natural rubber, butadiene rubber, and styrene-butadiene rubber, generally in the form of a cross-linked rubber mix. The cross-linked rubber mix is also generally in admixture with carbon black, an inorganic filler, vulcanization activator, and residual extractable and volatile materials.

In the method, pulverized rubber tire waste is subjected to a sulfonation process to produce sulfonated rubber tire waste. The sulfonation process can employ any of the conditions known in the art for sulfonating a polymeric material. As generally known in the art, the sulfonation process involves exposing the polymeric material (in this case, rubber tire waste) to a source of $SO_x$ species (typically, $SO_2$, preferably in an oxidizing environment, such as $O_3$, and/or $SO_3$ in an inert environment) for sufficient time to ensure substantial or complete sulfonation of the material.

In some embodiments, the sulfonation process includes submerging the rubber waste material in a sulfonation bath of, for example, sulfuric acid, fuming sulfuric acid, or chlorosulfonic acid, or their mixtures, to achieve substantial or complete (saturated) sulfonation of the material. In particular embodiments, to sulfonate the rubber tire waste, the rubber material is submerged into or passed through a liquid containing sulfur trioxide ($SO_3$), a sulfur trioxide precursor (e.g., chlorosulfonic acid, $HSO_3Cl$), sulfur dioxide ($SO_2$), or a mixture thereof. Typically, the liquid containing sulfur trioxide is fuming sulfuric acid, i.e., oleum, which typically contains 5-30%, or more particularly, 15-30%, free $SO_3$ or chlorosulfonic acid.

In other embodiments, to sulfonate the rubber tire waste, the rubber material is contacted with a sulfonating gas in a gaseous atmosphere (i.e., not in a liquid). For example, the rubber material can be introduced into a chamber containing $SO_2$ or $SO_3$ gas, or a mixture thereof, or a gaseous reactive precursor thereof, or mixture of the $SO_2$ and/or $SO_3$ gas with another gas, such as oxygen, ozone, or an inert gas, such as nitrogen or a noble gas (e.g., helium or argon).

The sulfonating liquid or gas may also include (i.e., be admixed with) one or more additional oxidants that may, for example, accelerate the sulfonation process and/or favorably adjust the density or type of oxidized groups formed on the surface of the rubber tire waste. Some examples of additional oxidants include ozone, air, oxygen, an inorganic or organic peroxide (e.g., hydrogen peroxide, cumene peroxide, or benzoyl peroxide), a peroxy acid (e.g., a peroxysulfuric or peroxycarboxylic acid), a chromate or dichromate (e.g., $K_2Cr_2O_7$), permanganate (e.g., $KMnO_4$), hypochlorite (e.g., HOCl or NaOCl), chlorite, perchlorate (e.g., $NaClO_4$), or nitrate (e.g., $HNO_3$ or $KNO_3$).

Various conditions in the sulfonation process can be adjusted to ensure substantial or complete sulfonation of the material. Some of the conditions that can be adjusted include, for example, residence time in the sulfonating agent, processing temperature, and reactivity or concentration of the sulfonating species. The sulfonation temperature is generally below a pyrolysis (carbonization) temperature, and more typically, at least 0° C., 10° C., 20° C., 30° C., 40° C., 50° C., 60° C., 70° C., 80° C., 90° C., 100° C., 110° C., or 120° C., and up to 150° C., 180° C., 200° C., 250° C., or 300° C. The residence time at sulfonation is very much dependent on several variables, including the sulfonation temperature used, concentration of sulfonating agent in the reaction medium, and size of the tire waste particles. The residence time is also dependent on the sulfonation method used (i.e., liquid or gas phase processes). As would be appreciated by one skilled in the art, the degree of sulfonation achieved at one particular sulfonating temperature and residence time can also be achieved by use of a higher sulfonation temperature for a shorter residence time, or by use of a lower sulfonation temperature for a longer residence time.

The degree of sulfonation can be determined by, for example, measuring the thermal characteristics (e.g., softening or charring point, or decomposition temperature associated with pyrolysis of the sulfonated material) or physical characteristics (e.g., density, rigidity, weight fraction of decomposable unsulfonated portion, or limiting oxygen index) of the sulfonated material. Since rigidity, as well as the softening and charring point (and thermal infusibility, in general) all increase with an increase in sulfonation, monitoring of any one or combination of these characteristics can be correlated with a level of sulfonation relative to a saturated level of sulfonation. In particular, the sulfonated material can be considered to possess a saturated (100%) level of sulfonation by exhibiting a constant thermal or physical characteristic with increasing sulfonation treatment time. In contrast, a material that has not reached a saturated level of sulfonation will exhibit a change in a thermal or physical characteristic with increasing sulfonation treatment time. Generally, the rubber tire waste material is at least substantially sulfonated with a sulfonation degree of at least 90% or 95%, relative to a saturated level of sulfonation taken as 100%. The level of sulfonation can be further verified or made more accurate by an elemental analysis. In some embodiments, the rubber material may be hyper-sulfonated by use of longer sulfonation time or high pressure in a gas phase reaction. In such cases, the degree of sulfonation (in wt. %) can be greater than 100%. In some embodiments, the degree of sulfonation can be determined or monitored at points during the process by use of thermogravimetric analysis (TGA), dynamic mechanical analysis (DMA), density measurement analysis, or other suitable analytical technique.

In some embodiments, to sulfonate the tire waste material, the tire waste material may be compounded with or melt-mixed with a sulfonation additive that evolves an $SO_x$ gas at elevated temperatures in order to effect sulfonation at the elevated temperature. The resulting additive-containing tire waste can then be heated to a desulfonation temperature effective for the liberation of $SO_x$ gas from the sulfonation additive. Liberation of $SO_x$ gas from the sulfonation additive results in sulfonation of the rubber material under an inert or reducing environment. With the use of an additive, the amount of sulfonation of the rubber material can be carefully controlled by quantifying the amount of sulfonation additive, e.g., by weight or molar ratio of the sulfonation additive with respect to total amount of rubber waste material.

The sulfonation additive can be any solid-state compound or material bearing reactive $SO_x$-containing groups (typically, —$SO_3H$, or sultone, i.e., —($SO_2$—O)—, or sulfate —(O—$SO_2$—O)— groups) that function to liberate $SO_2$ and/or $SO_3$ under elevated temperatures. In particular embodiments, the sulfonation additive is an organic (i.e., carbon-containing or carbonaceous) sulfonated compound or material. Some examples of organic sulfonated compounds or materials include sulfonated graphene, sulfonated diene rubber, sulfonated polyolefin, polyvinyl sulfate, sulfonated polystyrene, sulfonated lignin, and sulfonated mesophase pitch. Such organic sulfonated compounds are either commercially available or can be produced by methods well known in the art (e.g., by any of the liquid or gas sulfonation processes known in the art, as discussed above). Inorganic non-metallic sulfates, such as ammonium sulfate, ammonium bisulfate, or other such sulfates, can also be used as a sulfonation additive. Moreover, to increase compatibility of the additive with the rubber waste material, the sulfonation additive (e.g., graphene or other polycyclic aromatic compound or material) may be functionalized with hydrophobic aliphatic chains of sufficient length (e.g., hexyl, heptyl, octyl, or a higher alkyl chain) by methods well known in the art. In a particular embodiment, the sulfonation additive is elemental sulfur. The rubber material may or may not also be exposed to an electron beam, microwave, or UV radiation during reaction with sulfonating agents. After the sulfonation process, the sulfonated rubber tire waste may or may not be washed, typically with water.

The above-described sulfonated rubber tire waste is subjected to a pyrolysis process of sufficient temperature and other conditions (e.g., inert atmosphere) to carbonize the sulfonated rubber tire waste. Pyrolysis of the sulfonated rubber tire waste, under appropriate conditions, produces the carbon-carbon composite particles, as described above, having amorphous carbon black cores bonded to crystalline graphitic carbon shells. Generally, the pyrolysis step employs a temperature of at least 400° C., 450° C., or 500° C. In different embodiments, the pyrolysis temperature is about, at least, or above, for example, 400° C., 500° C., 600°

C., 700° C., 800° C., 900° C., 1000° C., 1100° C., 1200° C., 1300° C., 1400° C., 1500° C., 1600° C., 1700° C., 1800° C., 1900° C., 2000° C., 2200° C., 2500° C., 2800° C., or 3000° C., or a temperature within a range bounded by any two of the foregoing temperatures. The amount of time that the rubber material is subjected to the pyrolysis temperature (i.e., carbonization time) is highly dependent on the temperature employed. Generally, the higher the temperature employed, the shorter the amount of time required to achieve full carbonization. In different embodiments, depending on the temperature and other factors (e.g., pressure), the processing time can be, for example, about, at least, or no more than 0.02, 0.05, 0.1, 0.125, 0.25, 0.5, 1, 2, 3, 4, 5, 6, 7, 8, 9, 10, 11, or 12 hours, or within a range therein. In particular embodiments, it may be preferred to gradually raise the temperature at a set or varied temperature ramp rate (e.g., 5° C./min, 10° C./min, or 20° C./min). During the pyrolysis process, the rubber material may also be maintained at a particular temperature for a particular duration of time, before decreasing in temperature at a set or varied rate. The pyrolysis process may also be conducted as a two-stage process in which a first temperature carbonization step is followed by a higher temperature carbonization step. For example, a lower temperature pyrolysis (or volatilization) stage can be conducted at a temperature of, for example, 400, 500, or 600° C. (or in a range therein), and this followed by a higher temperature pyrolysis stage of 800, 900, 1000° C., 1100° C., 1200° C., 1300° C., 1400° C., 1500° C., or 1600° C. (or a range therein).

The pyrolysis process is conducted under an inert atmosphere in order to ensure carbonization instead of volatilization. To be inert, the atmosphere is substantially or completely composed of an inert gas, such as nitrogen ($N_2$) or a noble gas (e.g., helium or argon). The inert atmosphere is generally substantially or completely devoid of reactive gases, particularly oxygen. By being substantially or completely devoid of reactive gases is meant that any reactive gas is present in a negligible or trace amount (e.g., up to or less than 1 vol %, 0.5 vol %, or 0.1 vol %) or completely absent. The inert gas is generally made to flow at a specified flow rate, such as 0.1, 0.25, 0.50, 1, 5, 10, 20, or 30 L/min, during the pyrolysis process. The end result of the pyrolysis process is the production of carbon-carbon composite particles having amorphous carbon black cores bonded to crystalline graphitic shells, as described above.

In one embodiment, one or more metal oxide materials, as described above, are admixed and compounded with the pyrolyzed material composed of carbon-carbon composite particles. Generally, the metal oxide material is in particulate (powder) form, as also described above, and included in an amount of at least about 10 wt. % or in any amount desired to be included in the final composite material, such as any of the amounts provided above. The term "compounded," as used herein, refers to an integral mixing or blending process of solid materials in which the components are intimately mixed to the extent that the different compositions are evident only at the microscale or nanoscale. Methods and devices for achieving such intimate mixtures are well known in the art, and include, for example, ball milling and vertical roller milling. The admixing and compounding process results in the carbon-metal oxide composite material described above.

In an alternative embodiment, metal oxide material is not directly added to the pyrolyzed carbon-carbon composite, as above, but produced during the pyrolysis process from a metal oxide precursor material introduced prior to the pyrolysis process. For example, the sulfonated pulverized rubber tire material may be admixed and compounded with a metal oxide precursor material, and the sulfonated rubber-metal oxide precursor mix subjected to pyrolysis. The metal oxide precursor material should be capable of being converted to a metal oxide when contacted with trace amounts of water under the elevated temperature condition used in pyrolysis (i.e., oxygen gas should not be required, which permits an inert atmosphere to be used). A trace amount of water is generally present in the sulfonated rubber. The metal oxide precursor can be, for example, a metal halide, such as $SnCl_2$ or $SnCl_4$, or a metal hydroxide, such as $Sn(OH)_2$. The metal oxide precursor may also be a halide, hydroxide, halide-hydroxide, hydroxide-oxide, or sulfate of any of the metals provided above for the metal oxide. The pyrolyzed product may or may not be further compounded to ensure that the produced metal oxide material is integrally incorporated into the final composite. In some embodiments, the metal oxide precursor is an elemental form of a metal capable of reacting with water at the elevated temperatures used in pyrolysis to form a metal oxide. The elemental metal may be, for example, elemental tin or an alkaline earth metal.

In some embodiments, the carbon-metal oxide composite, as produced above, is disposed or deposited on a conductive substrate suitable as an anode of a lithium-ion or sodium-ion battery. For example, in one embodiment, a blended mixture of pyrolyzed rubber and metal oxide is admixed with a binder and solvent (and optionally, a conductive material, such as conductive carbon) and the slurry deposited on a conductive substrate (e.g., copper or aluminum) and casted by solvent removal and heating and/or pressing. In another embodiment, a blended mixture of sulfonated rubber and metal oxide precursor (optionally, admixed with a binder, solvent, and conductive material) is deposited on a conductive substrate and subjected to pyrolysis as a coating on the substrate.

In another aspect, the invention is directed to an alkali-ion (i.e., lithium- or sodium-ion) battery that includes the above-described carbon-metal oxide composite material in at least an anode of the battery. The battery can have a rechargeable or non-rechargeable design, but is more typically rechargeable. The lithium ion battery may contain any of the components typically found in a lithium ion battery, including positive and negative electrodes (i.e., cathode and anode, respectively), current collecting plates, and a battery shell, such as described in, for example, U.S. Pat. Nos. 8,252,438, 7,205,073, and 7,425,388, the contents of which are incorporated herein by reference in their entirety. The positive electrode (cathode) can be, for example, manganese dioxide ($MnO_2$), iron disulfide ($FeS_2$), copper oxide (CuO), or a lithium metal oxide in which the metal is typically a transition metal, such as Co, Fe, Ni, or Mn, or combination thereof, e.g., $LiCoO_2$, $LiNiCoO_2$, $LiMnO_2$, and $LiFePO_4$. Recently, with an effort to increase the energy density of the LIBs, 5.0V positive electrode materials, such as $LiNi_{0.5}Mn_{1.5}O_4$, $LiNi_xCo_{1-x}PO_4$, and $LiCu_xMn_{2-x}O_4$, have been developed (Cresce, A. V., et al., *Journal of the Electrochemical Society*, 2011, 158, A337-A342). To improve conductivity at the positive electrode, conductive carbon material (e.g., carbon black, carbon fiber, or graphite) is typically admixed with the positive electrode material. The negative electrode (anode) includes the above-described carbon-metal oxide composite material, and may or may not also include graphite (e.g., natural or artificial graphite), petroleum coke, carbon fiber (e.g., mesocarbon fibers), or carbon (e.g., mesocarbon) microbeads, as also commonly used. The anode may also include a separate layer of a metal oxide, such as tin dioxide ($SnO_2$) or titanium dioxide ($TiO_2$). The positive and negative electrode compositions are typically admixed with an adhesive (e.g., PVDF, PTFE, and co-polymers thereof) in order to be properly molded as electrodes. Typically, positive and negative current collecting substrates (e.g., Cu or Al foil) are also included.

The assembly and construction of lithium-ion and sodium-ion batteries are well known in the art. Lithium-ion batteries have been amply discussed above. Sodium-ion batteries are also well known in the art, such as described in, for example, U.S. Application Publication No. 2012/0021273, and B. L. Ellis, et al., *Current Opinion in Solid State and Materials Science*, 16, 168-177, 2012, the contents of which pertaining to sodium-ion batteries are herein incorporated by reference in their entirety. The sodium-ion battery may employ, for example, a sodium inorganic material as the active material in the cathode. Some examples of sodium inorganic materials include, for example, $NaFeO_2$, $NaMnO_2$, $NaNiO_2$, and $NaCoO_2$. Other cathode materials for sodium-ion batteries include transition metal chalcogenides, such as described in U.S. Pat. No. 8,906,542, and sodium-lithium-nickel-manganese oxide materials, such as described in U.S. Pat. No. 8,835,041, the contents of which are herein incorporated by reference in their entirety.

The battery includes an electrolyte in contact with the anode and cathode, wherein the electrolyte can be a liquid, solid, or gel type of electrolyte, all of which are well known in the art. In particular embodiments, the electrolyte includes a lithium- or sodium-containing salt dissolved in a liquid, typically an organic solvent or ionic liquid. Some examples of lithium salts include $LiPCl_6$, $LiPF_6$, $LiClO_4$, $LiAlCl_4$, $LiAlBr_4$, $Li(CH_3SO_3)$, $Li(CH_3CH_2SO_3)$, $Li(CF_3SO_3)$, $Li(CF_3CF_2SO_3)$, $LiSbF_6$, and $LiAsF_6$. Some examples of sodium salts include $NaClO_4$, $NaPF_6$, $NaAsF_6$, $NaSbF_6$, $NaBF_4$, $NaCF_3SO_3$, $NaAlCl_4$, or $NaN(SO_2CF_3)_2$). The lithium or sodium salt is typically present in an amount of at least or above 0.1 M concentration in the electrolyte. In different embodiments, the lithium or sodium salt is present in the electrolyte in a concentration of about, at least, above, up to, or less than, for example, 0.5, 1.0, 1.2, 1.5, 1.8, 2, 2.5, or 3 M.

In one embodiment, the solvent in the electrolyte is an organic solvent. The term "organic solvent," as used herein, refers to any non-ionic carbon-containing solvent known in the art. The organic solvent typically has a melting point up to or less than 100, 90, 80, 70, 60, or 50° C., and more typically, below room temperature, i.e., below about 25° C., and more typically, up to or less than 20, 15, 10, 5, or 0° C. The organic solvent, which is typically also an aprotic polar solvent, can be, for example, a carbonate, sulfone, siloxane, silane, ether, ester, nitrile, sulfoxide, or amide solvent, or a mixture thereof. Some examples of carbonate solvents include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC). Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone). Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, a dioxane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The non-ionic solvent can be included in a non-additive or additive amount, such as any of the exemplary amounts provided above for the ionic liquids. The non-ionic solvent may also be, for example, an organochloride (e.g., methylene chloride, chloroform, 1,1,-trichloroethane), ketone (e.g., acetone, 2-butanone), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA). In some embodiments, any one or more classes or specific types of organic solvents are excluded from the electrolyte.

In another embodiment, the solvent in the electrolyte is an ionic liquid. The ionic liquid can be conveniently described by the formula $Y^+X^-$, wherein $Y^+$ is a cationic component of the ionic liquid and $X^-$ is an anionic component of the ionic liquid. The formula $(Y^+)(X^-)$ is meant to encompass a cationic component ($Y^+$) having any valency of positive charge, and an anionic component ($X^-$) having any valency of negative charge, provided that the charge contributions from the cationic portion and anionic portion are counter-balanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables). The foregoing generic formula encompasses numerous possible sub-formulas, such as, for example, $(Y^+)(X^-)$, $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. For simplicity, numerous embodiments of ionic liquids, described below, designate the anion as X⁻, which in its strict sense indicates a monovalent anion. However, the anion designated as X⁻ is meant to encompass an anion of any valency, such as any of the valencies described above and further below, unless otherwise specified. In some embodiments, Y⁺ can be a metal cation (e.g., an alkali metal, such as Li⁺), while in other embodiments Y⁺ is not a metal cation. In some embodiments, Y⁺ can be an inorganic species, while in other embodiments, Y⁺ is an organic species.

The ionic liquid is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion (Y⁺) of the ionic liquid Y⁺X⁻ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion (X⁻) of the ionic liquid can be any of the counteranions well known in the art and as provided above for the lithium or sodium salt. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may also be substituted by one or more hydrocarbon groups. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids: Properties and Applications", *Chem. Rev.*, 108, pp. 206-237 (2008), the contents of which are herein incorporated by reference in their entirety. Any of the ionic liquids described in the foregoing reference may be used herein. Moreover, in some embodiments, the liquid aspect of the electrolyte can include only an organic solvent, only an ionic liquid, or an admixture of an organic solvent and ionic liquid, in which case either the organic solvent may be included in an approximately equivalent or greater amount than the ionic liquid or vice-versa. In some embodiments, any one or more types of ionic liquids described above are excluded from the electrolyte.

The lithium-ion or sodium-ion battery described above may, in some embodiments, exhibit a reversible capacity of at least 500, 550, 600, 625, 650, or 700 mAh/g for at least 10, 20, 30, 40, 50, 60, 70, 80, 90, or 100 cycles. The battery may also exhibit a high coulombic efficiency of at least, for example, 80%, 85%, 90%, 95%, or about 100% after any of the number of cycles provided above.

Examples have been set forth below for the purpose of illustration and to describe certain specific embodiments of the invention. However, the scope of this invention is not to be in any way limited by the examples set forth herein.

EXAMPLES

Preparation and Analysis of a Carbon-Tin Oxide Composite Material

Tin (Sn) and its oxide forms (SnO, SnO$_2$) are of interest as potential high capacity anode materials. If all the oxygen converts into Li$_2$O, the theoretical capacities of Sn, SnO and SnO$_2$ are 993, 1273, and 1494 mAh/g, respectively. Unfortunately, the large volume change occurring during the charge and discharge process poses serious problems. The large volume change leads to pulverization, mechanical degradation, and loss of electrical contact for electron conduction between the particles, resulting in fast capacity fade. Much effort has been made to alleviate these issues, such as use of hollow structures to encapsulate the materials, inactive supporting material matrix, and carbon nanotubes (CNTs) surface coatings. However, most of the methods only provide a slight performance improvement for tin-based anode materials, and the capacity fading is generally still present. Only a few methods show good stability when integrated with graphene or CNTs, but the material costs remain high for industrial applications.

The method described herein provides low-cost, high-capacity battery anodes using tire-derived carbon and tin oxide (SnO/SnO$_2$) composites with impressive performance in a lithium-ion battery configuration. Experimental shredded tire rubber of irregular shapes (0.3-1 cm size) was used to derive carbon by soaking it in concentrated sulfuric acid bath at 120° C. for 14 days and subsequent washing in water. The washed sulfonated residue was then pyrolyzed in a tubular furnace under a flowing nitrogen atmosphere. The temperature of the furnace was ramped up in two stages, from room temperature (about 20-25° C.) to 400° C. at 1° C./min and 400° C. to 1100° C. at 2° C./min followed by cooling to room temperature. The pyrolyzed residue yielded about 50% carbon. The composite was then prepared by ball-milling the pyrolyzed carbon and SnO for 12 hours using a high speed mill.

Figure 1:
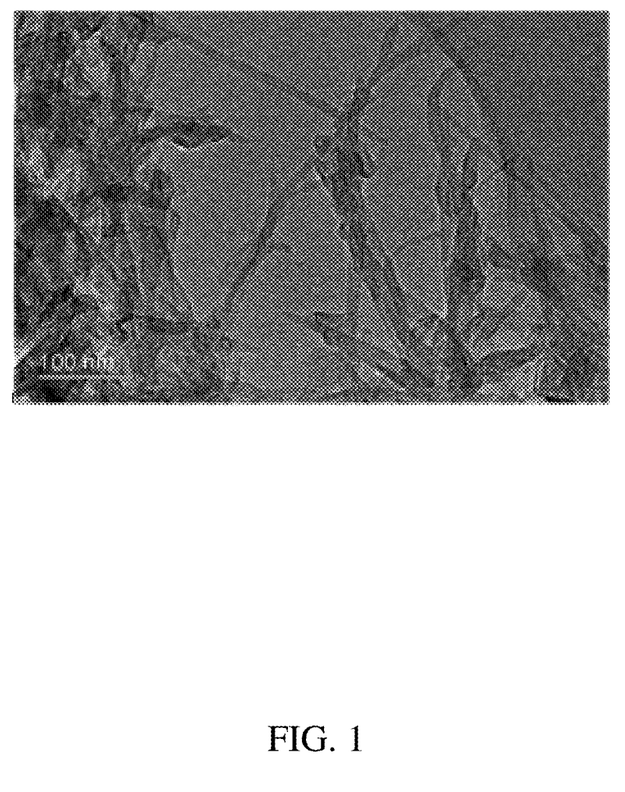
FIG. 1. A transmission electron microscope (TEM) image of carbon-tin oxide composite material produced by sulfonating rubber tire waste followed by pyrolysis and then blending with tin oxide (SnO) particles.
Figure 2:
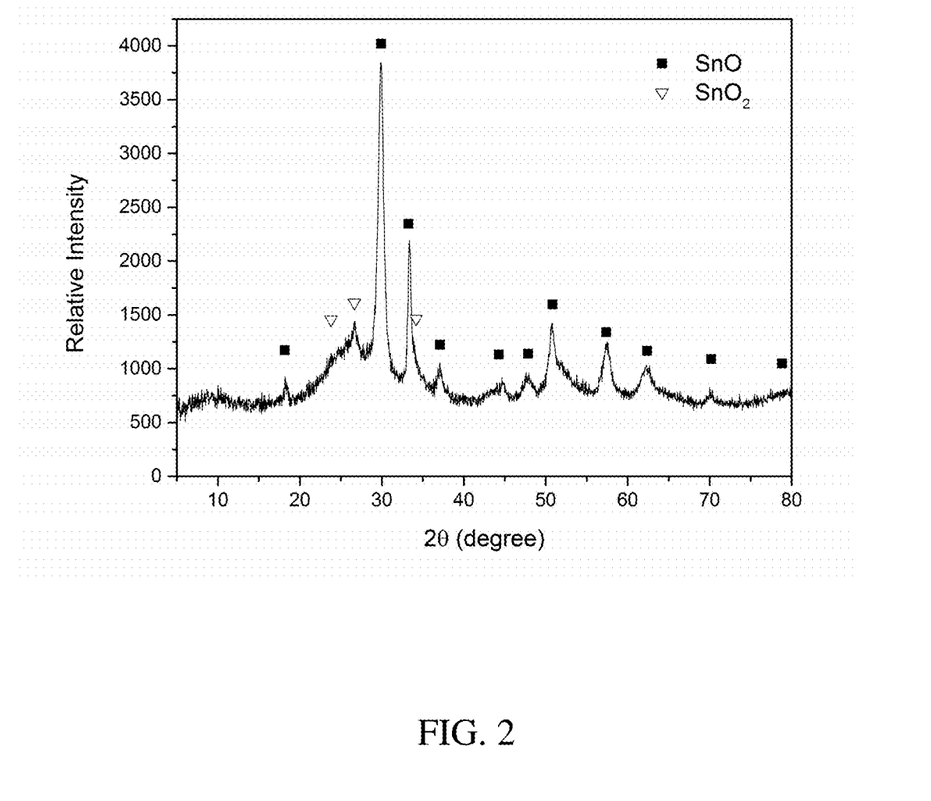
FIG. 2. X-ray powder diffraction pattern of the carbon-tin oxide composite material.

A transmission electron microscope (TEM) image of the pyrolyzed carbon material, as produced above, is shown in FIG. 1. As shown in FIG. 1, the microstructure of tire-derived carbon exhibits a three-dimensional interconnected and random morphology. It has a high surface area with a tubular shape and a relative loose-packed morphology. Because the amount of carbon is higher than the amount of SnO, the well mixed composite results in a well defined carbon coating of the SnO particles (i.e., tin oxide embedded with carbon) and may possibly provide a mechanical support and electronic conduction between the SnO particles. A particular advantage of the carbon-coated tin oxide structure is that, during the lithiation and delithiation process, the porous carbon structure can expand or contract (i.e., "breathe") with SnO to compensate for any volume expansion and contraction in the course of cycling. This morphology is believed to be at least partly responsible in alleviating the capacity fade and improving durability of the battery, as further discussed below. The X-ray powder diffraction pattern of the ball-milled tire-derived carbon and SnO composite is shown in FIG. 2. The presence of an SnO phase along with minor amounts of SnO$_2$ phase is observed in addition to amorphous carbon materials. Partial oxidation of SnO to SnO$_2$ could have occurred during ball-milling in air.

Figure 3A:
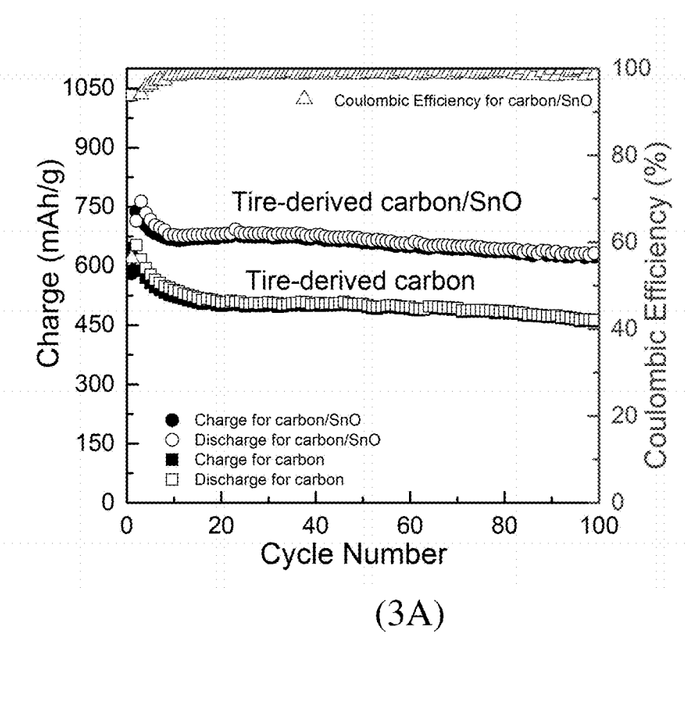
FIGS. 3A and 3B. Graphs showing electrochemical cycling (FIG. 3A) and tenth cycle voltage profile of the carbon-tin oxide composite material in a half-cell test (FIG. 3B).
Figure 3B:
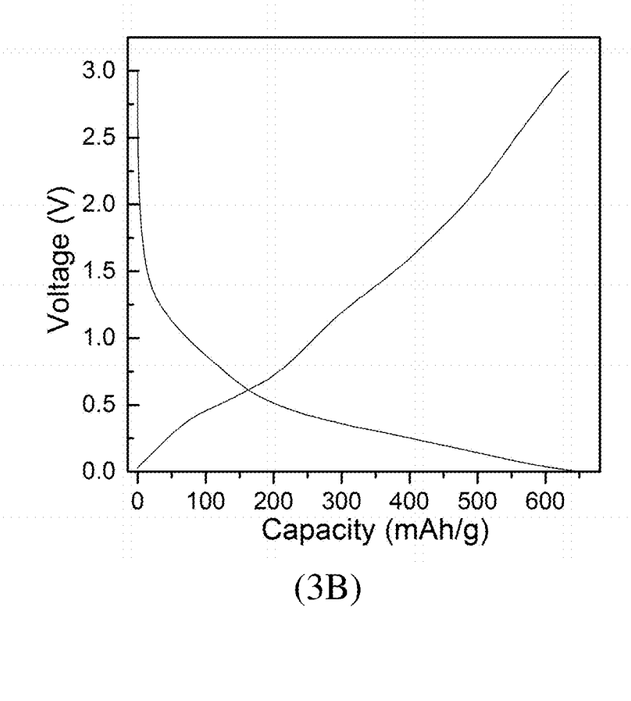

Some preliminary electrochemical cycling data is shown in FIGS. 3A and 3B. The composite was tested in a half-cell (Li/electrolyte/composite) configuration under a constant current density of 40 mA/g. The capacity retention data in FIG. 3A shows a very stable cyclability of up to 30 cycles.

As also shown in FIG. 3A, the first cycle efficiency was about 60% then it quickly increased to over 90% for the second cycle. The large irreversible capacity for the first cycle could be due to the solid electrolyte interface (SEI) formation and the reaction of the functional group on the surface of the carbon with lithium. In order to understand the effect of tin oxide addition, the cycling performance of tire-derived carbon powders without tin oxide addition is also plotted in FIG. 3A. Notably, the composite has a reversible capacity of 645 mAh/g compared to a reversible capacity of 490 mAh/g for the tire-derived carbon without the tin oxide, which is an improvement of over 30 percent. The large capacity improvement is likely at least partly a result of the unique morphology, good conduction, and robust supporting structure of the tire-derived carbon.

FIG. 3B shows the tenth cycle voltage profile of the tire-derived carbon and tin oxide composite in a half cell test. The voltage profile in FIG. 3B shows the voltage changes with increasing capacity. Because both tire-derived carbon and SnO exhibit sloping behavior during discharge, the results for the composite are in good agreement with the performance exhibited by the combination of materials. A large portion (>450 mAh/g) of the discharge capacity is obtained at a voltage below 0.5 V, which will enhance the voltage difference between the cathode and the anode, which in turn will increase the energy density of the full cell.

The tire-derived carbon/SnO composite studied in this experiment provides a low-cost, high-capacity anode material with good cyclability. The high performance carbon-tin oxide composite for use in lithium-ion or sodium-ion batteries, along with the developed method, add new value to carbon powders recovered from recycled tires. Tin oxide films can also be coated onto tire-derived carbon powders to improve the capacity of anodes in the lithium-ion configuration. The coating can be achieved by any vacuum or non-vacuum techniques, such as slurry coating, slot-die coating, ink-jet printing, and the like. Similarly, other metal oxides, such as NiO, $Fe_2O_3$, $Fe_3O_4$, $Cu_2O$, CuO, $TiO_2$, $Nb_2O_5$, $TiNb_2O_7$, and other transition metal oxides, can be mixed with tire-derived carbon powders to prepare composite powders. Sulfur, phosphorous, silicon, and other non-oxides may also be added.

While there have been shown and described what are at present considered the preferred embodiments of the invention, those skilled in the art may make various changes and modifications which remain within the scope of the invention defined by the appended claims.

What is claimed is:

1. A carbon-metal oxide composite material comprising:
   (i) carbon-carbon composite particles in which an amorphous carbon black core is bonded to crystalline graphitic carbon shells; and
   (ii) a metal oxide material bonded with said carbon-carbon composite particles,
   wherein said metal oxide material is included in an amount of at least about 10 wt. % by weight of said carbon-carbon composite particles and metal oxide material.

2. The carbon-metal oxide composite of claim 1, wherein said metal oxide is selected from main group and transition metal oxides.

3. The carbon-metal oxide composite of claim 1, wherein said metal oxide is selected from oxides of titanium, vanadium, chromium, manganese, iron, cobalt, nickel, copper, niobium, tungsten, gallium, indium, and tin.

4. The carbon-metal oxide composite of claim 1, wherein said metal oxide comprises a tin oxide.

5. The carbon-metal oxide composite of claim 1, wherein said metal oxide is included in an amount of at least 15 wt. % by weight of said carbon-carbon composite particles and metal oxide material.

6. The carbon-metal oxide composite of claim 1, wherein said carbon-carbon composite particles possess micropores having a size of less than 2 nm.

7. The carbon-metal oxide composite of claim 1, wherein said carbon-carbon composite particles have a total pore volume of up to about 0.1 $cm^3/g$.

8. An alkali-ion battery comprising:
   (a) an anode comprising a carbon-metal oxide composite material comprising:
      (i) carbon-carbon composite particles in which an amorphous carbon black core is bonded to crystalline graphitic carbon shells; and
      (ii) a metal oxide material bonded with said carbon-carbon composite particles;
      wherein said metal oxide material is included in an amount of at least about 10 wt. % by weight of said carbon-carbon composite particles and metal oxide material;
   (b) a cathode; and
   (c) a lithium-containing or sodium-containing electrolyte in contact with said anode and cathode.

9. The alkali-ion battery of claim 8, wherein said metal oxide is selected from main group and transition metal oxides.

10. The alkali-ion battery of claim 8, wherein said metal oxide is selected from oxides of titanium, vanadium, chromium, manganese, iron, cobalt, nickel, copper, niobium, tungsten, gallium, indium, and tin.

11. The alkali-ion battery of claim 8, wherein said metal oxide comprises a tin oxide.

12. The alkali-ion battery of claim 8, wherein said metal oxide is included in an amount of at least 15 wt. % by weight of said carbon-carbon composite particles and metal oxide material.

13. The alkali-ion battery of claim 8, wherein said carbon-carbon composite particles possess micropores having a size of less than 2 nm.

14. The alkali-ion battery of claim 8, wherein said carbon-carbon composite particles have a total pore volume of up to about 0.1 $cm^3/g$.

15. A method for producing a carbon-metal oxide composite material, the method comprising:
   (i) subjecting pulverized rubber tire waste material to a sulfonation process to produce sulfonated rubber tire waste;
   (ii) pyrolyzing the sulfonated rubber tire waste in an inert atmosphere to produce carbon-carbon composite particles in which an amorphous carbon black core is bonded to crystalline graphitic carbon shells; and
   (iii) admixing and compounding a metal oxide material with said carbon-carbon composite particles to produce said carbon-metal oxide composite material in which said metal oxide material is bonded with said carbon-carbon composite particles,
   wherein said metal oxide material is included in an amount of at least about 10 wt. % by weight of said carbon-carbon composite particles and metal oxide material.

16. The method of claim 15, wherein said sulfonation process comprises contacting said pulverized rubber tire waste material with a sulfonating agent at a temperature of at least 30° C. and up to 180° C.

17. The method of claim 16, wherein said sulfonating agent is oleum-containing sulfuric acid.

18. The method of claim 15, wherein, after said step (i) and before said step (ii), said sulfonated rubber tire waste is washed.

19. The method of claim 15, wherein said pyrolyzing step (ii) is conducted at a temperature of at least 500° C.

20. The method of claim 15, wherein said pyrolyzing step (ii) is conducted at a temperature of at least 800° C.

21. The method of claim 15, wherein said metal oxide is selected from main group and transition metal oxides.

22. The method of claim 15, wherein said metal oxide is selected from oxides of titanium, vanadium, chromium, manganese, iron, cobalt, nickel, copper, niobium, tungsten, gallium, indium, and tin.

23. The method of claim 15, wherein said metal oxide comprises a tin oxide.

24. The method of claim 15, wherein said metal oxide is included in an amount of at least 15 wt. % by weight of said carbon-carbon composite particles and metal oxide material.

25. The method of claim 15, wherein said carbon-carbon composite particles possess micropores having a size of less than 2 nm.

26. The method of claim 15, wherein said carbon-carbon composite particles have a total pore volume of up to about 0.1 $cm^3/g$.

27. The method of claim 15, further comprising depositing said carbon-metal oxide composite material on a conductive substrate suitable for an anode of a lithium-ion battery.

28. A method for producing a carbon-metal oxide composite material, the method comprising:
   (i) subjecting pulverized rubber tire waste material to a sulfonation process to produce sulfonated rubber tire waste;
   (ii) admixing and compounding a metal oxide precursor material with said sulfonated rubber tire waste; and
   (iii) pyrolyzing the admixture of sulfonated rubber tire waste and metal oxide precursor in an inert atmosphere to produce carbon-carbon composite particles bonded with a metal oxide material derived from said metal oxide precursor material, wherein said carbon-carbon composite particles are constructed of an amorphous carbon black core bonded to crystalline graphitic carbon shells;
   wherein said metal oxide material is in an amount of at least about 10 wt. % by weight of said carbon-carbon composite particles and metal oxide material.

29. The method of claim 28, wherein said metal oxide precursor is a metal halide.

* * * * *